US008931515B2

United States Patent
Linnhoff

(10) Patent No.: US 8,931,515 B2
(45) Date of Patent: Jan. 13, 2015

(54) PULSE VALVE

(75) Inventor: Hans-Josef Linnhoff, Haltern am See (DE)

(73) Assignee: Allmineral Aufbereitungstechnik GmbH & Co. KG, Duisburg (DE)

(*) Notice: Subject to any disclaimer, the term of this patent is extended or adjusted under 35 U.S.C. 154(b) by 320 days.

(21) Appl. No.: 13/581,331

(22) PCT Filed: Feb. 24, 2011

(86) PCT No.: PCT/EP2011/000892
§ 371 (c)(1),
(2), (4) Date: Oct. 18, 2012

(87) PCT Pub. No.: WO2011/104019
PCT Pub. Date: Sep. 1, 2011

(65) Prior Publication Data
US 2013/0207013 A1    Aug. 15, 2013

(30) Foreign Application Priority Data
Feb. 27, 2010  (DE) .......................... 10 2010 009 617

(51) Int. Cl.
*F16K 31/04* (2006.01)
*F16K 11/085* (2006.01)
*B03B 5/24* (2006.01)

(52) U.S. Cl.
CPC ............. *F16K 31/041* (2013.01); *F16K 11/085* (2013.01); *B03B 5/24* (2013.01); *F16K 11/0856* (2013.01)
USPC ................. 137/625.46; 137/595; 137/625.47; 137/625.16; 137/625.19

(58) Field of Classification Search
CPC ............................... B03B 5/24; F16K 11/0525
USPC ............ 137/625.46, 625.47, 625.16, 625.19, 137/595
See application file for complete search history.

(56) References Cited

U.S. PATENT DOCUMENTS

| 782,269 | A | * | 2/1905 | Ramsdell ....................... 110/103 |
| 2,164,057 | A | * | 6/1939 | Fink ........................... 237/12.3 A |
| 4,281,686 | A | * | 8/1981 | Gerlitz ........................... 137/887 |
| 4,842,146 | A | * | 6/1989 | Jondro et al. .................. 209/455 |
| 5,105,853 | A | * | 4/1992 | Lie ............................ 137/625.46 |
| 6,263,917 | B1 | * | 7/2001 | Evans ........................... 137/595 |
| 7,600,535 | B2 | * | 10/2009 | Baumgarten et al. ..... 137/625.43 |
| 2003/0150415 | A1 | * | 8/2003 | Hedman .................... 123/90.12 |
| 2004/0221900 | A1 | * | 11/2004 | Kaske ....................... 137/624.13 |
| 2009/0032129 | A1 | * | 2/2009 | Yamawaki et al. ....... 137/625.46 |
| 2010/0212743 | A1 | * | 8/2010 | Li et al. ............................ 137/1 |
| 2012/0007009 | A1 | * | 1/2012 | Yie ............................... 251/321 |

* cited by examiner

Primary Examiner — John K Fristoe, Jr.
Assistant Examiner — Christopher Ballman
(74) Attorney, Agent, or Firm — Jennifer S. Stachniak; Robert W. Becker

(57) ABSTRACT

A pulse valve for generating a high-volume pulsating fluid stream from a fluid supplied to the pulse valve from a pressure-generating unit. Window cut-outs are disposed opposite one another in pairs, in a housing wall, and form a first channel for conducting a constant, stationary sub-stream, a second channel for generating a second sub-stream that forms a basic pulse component, and a third channel for generating a third sub-stream that forms an additional pulse component. A rotatable rotor shaft disposed in the interior of the housing is provided with respective rotor blade assemblies associated with the second and third channels respectively. Upon rotation of the rotor shaft, the rotor blade assemblies, in cooperation with boundary edges of the window cut-outs of the second and third channels, periodically either allow a fluid stream impinging on the pulse valve to pass through the housing, or to interrupt such passage.

13 Claims, 2 Drawing Sheets

PULSE VALVE

The instant application should be granted the priority dates of Feb. 27, 2010, the filing date of the corresponding German patent application 10 2010 009 617.2, as well as Feb. 24. 2011, the filing date of the International patent application PCT/EP20111/000892.

BACKGROUND OF THE INVENTION

The invention relates to a pulse valve for generating a high-volume pulsating fluid stream from a fluid fed to the pulse valve by a pressure-generating unit.

Such pulse valves are used for example to control so-called air jigging machines for the preparation of minerals. According to DE 628 060 A, a pulse valve used in a compressed air supply line is known from this area of use, said pulse valve not filling the cross-section of the line, but leaving a considerable part of the line free on both sides, even when the pulse valve as in a blocking position for the fluid stream flowing through the supply line. A constant sub-stream and a pulsating sub-stream generated through the pulse valve are thus surer imposed and a pulsating fluid stream is thus generated.

Through use, it is further known in such applications to divide the pulsating sub-stream further into a basic pulse component and into an additional pulse component, such pulse controls only being able to be implemented with a plurality of individual valves and expensive pipeline systems.

The problem underlying the invention, therefore, is to make available a pulse valve which, with a uniform and straightforward structure, generates a pulsating fluid stream that can comprise a plurality of sub-streams.

SUMMARY OF THE INVENTION

In its basic idea, the invention provides a pulse valve, wherein a first channel for conducting a constant stationary sub-stream, a second channel for generating a second sub-stream forming a basic pulse component and a third channel for generating a third sub-stream forming an additional pulse component of the pulsating fluid stream generated by the pulse valve are provided in the housing of the pulse valve, wherein the channels are formed by window cut-outs lying opposite one another in pairs in the housing wall, and a rotatable rotor shaft having rotor blade assemblies associated with the second channel and the third channel respectively is disposed in the interior of the housing, said rotor blade assemblies in cooperation with the boundary edges of the window cut-outs of the second and the third channels periodically allowing the fluid stream impinging on the pulse valve to pass through the housing and interrupting the same during rotation of the rotor shaft.

Associated with the invention is the advantage that a pulsating fluid stream comprising three sub-streams, a stationary sub-stream, a basic pulse sub-stream and an additional pulse sub-stream, can be made available by means of a pule valve comprising a uniform housing.

The pulse valve according to the invention can be used not only in the initially mentioned technical area of air jigging machines, but can be used in all technical fields in which a pulsating fluid stream is required. The flowing medium can be compressible, i.e. present in the form of a gas, or also incompressible as a liquid.

In the first place, the invention is based on the basic principle that the pulse valve can be installed in a pipeline using a housing enclosing the pulse valve and can transform the fluid stream flowing through this pipeline into a pulsating fluid stream. For this purpose, window cut-outs lying opposite one another in pairs are admitted into the housing of the pulse valve, the cross-section whereof fixes the size of the sub-stream to be conducted in each case through the channel thus formed. When the rotor shaft carrying the rotor blade assemblies is caused to rotate, the cross-section of the first channel remains unchanged and thus fixes the stationary component of the pulsating fluid stream generated by the pulse valve. Inasmuch as rotor blade assemblies rotating with the rotor shaft are associated respectively with the second and the third channel, these rotor blade assemblies temporarily block the associated window cut-outs; in this period, only the stationary stream prevails. When the outer edge of a rotor blade assembly sweeps over a boundary edge of a window cut-out, a gradually opening cross-section arises, which allows the passage of an increasingly large volume flow. The flow cross-section diminishes again when the outer edge of the rotor blade assembly approaches the window cut-out boundary edge lying opposite in the direction of rotation. The channel concerned is closed when this edge is reached.

Inasmuch as the cross-section of the window cut-out fixes the size of the sub-stream flowing through the associated channel, the extension of the window cut-outs directed towards the opposite window cut-out of the pair of window cut-outs determines the width, i.e. the duration, of a pulse fixed by the opening and closing of the window cut-outs by the rotor blade assembly. The extension of the window cut-out established at right angles thereto fixes the maximum volume flow in each case and thus the amplitude of the pulse. The shape of the window cut-outs in the housing wall can in this respect be constituted arbitrarily in order to influence the pulse generated in each case.

Whilst the implementation of the invention first proceeds from a fixed shape of the window cut-outs, provision can be made according to an exemplary of embodiment of the invention such that the window cut-outs disposed in the housing well are provided so as to be adjustable in their extension directed towards the opposite window cut-out, so that the duration of a pulse can be adjusted in the case of the pulse valve thus constituted.

According to alternative exemplary embodiment of the invention, the window cut-outs lying opposite one another in pairs can be disposed in a symmetrical arrangement or also in an asymmetrical arrangement in the housing wall.

According to a further exemplary embodiment of the invention, provision can be made such that the rotor blade assemblies associated with the second channel and/or the third channel are displaceable and/or rotatable with respect to the window cut-outs present in the housing wall. Through the displacement of the rotor blade assemblies in the longitudinal axis of the rotor shaft, the effective cross-section of the window cut-outs covered by the rotor blade assembly can be changed by way of a width adjustment, so that the size of the sub-stream flowing through the channel concerned and therefore the amplitude of the generated pulse, i.e. the basic pulse and/or the additional pulse, can thus be adjusted. Inasmuch as provision is made, additionally or alternatively, to rotate relative to one another the rotor blade assemblies associated with the two channels, the phase position of the additional pulse is thus adjusted relative to the basic pulse. As a result, a steeper or flatter rise in the course of the added cross-section arises depending on the phase position of the additional pulse, i.e. a different center of gravity position associated with a different pulse width. With increasing rotation of the rotor blade assemblies with respect to one another, the additional channel gradually generates its own stall pulse, which can be located upstream or downstream of the basic pulse in terms of time.

According to first specific embodiment of the invention, provision is made such that the first channel and the second channel are formed by a common pair of window cut-outs and in order divide the flow path thus formed into the first and the second channel, an adjustment disc orientated with its face in the flow direction is disposed on the rotor shaft, the rotor blade assembly being disposed at one side of said adjustment disc.

In a further development, provision can be made such that the adjustment disc is disposed displaceably on the rotor shaft and extension blades overlapping with the rotor blades are fitted on the adjustment disc to compensate for its adjustment path with respect to the rotor blades fixed relative to the rotor shaft, the rotor blades and extension blades being displaceable with respect to one another by means of an adjustment mechanism. The effect of this is that, by means of the adjustment of the adjustment disc, the cross-sectional ratios between the first channel and the second channel are variable or adjustable, so that the ratio of the stationary component and the basic pulse component in the pulsating stream generated as a whole can be adapted to different requirements.

With regard to the structural design, provision is made according to an exemplary embodiment of the invention such that the rotor blades are carried by a support disc fixed to the rotor shaft. When the rotor shaft is rotated, therefore, the rotor blades are carried along, which then for their part carry along the extension blades coupled thereto with the adjustment disc.

In addition to or as an alternative to the adjustment possibility for the adjustment disc, provision can be made such that the cross-section of the first stationary channel can be adjusted by the fitting of block discs to the housing cover of the housing lying opposite the adjustment disc. The cross-section of the first channel is thus likewise additionally variable or adjustable. In an alternative embodiment, provision can be made such that the cross-section of the first stationary channel can be adjusted by the arrangement of a displaceable piston on the housing cover of the housing lying opposite the adjustment disc.

With a view to an additionally provided adjustment of the additional pulse component in the pulsating fluid stream generated as a whole, provision is made according to an exemplary embodiment of the invention such that separate rotor blade assemblies are associated with the pair of window cut-outs forming the third channel, said separate rotor blade assemblies comprising extension blades fitted on a carrier disc disposed rotatably relative to the rotor shaft and rotor blades disposed overlapping with said extension blades and connected to an adjustment piston disposed displaceably along the rotor shaft and rotatably with respect to the rotor shaft, wherein the extension blades and the rotor blades can be displaced with respect to one another by means of an adjustment mechanism. Provision can be made such that the carrier disc with the extension blades fixed thereto is supported on the support disc rigidly connected to the rotor shaft so as to be rotatable with respect to the latter through a rotation path, in such a way that, when the carrier disc is rotated relative to the support ill disc, the extension blades carry along the rotor blades with the adjustment piston, said rotor blades being coupled with the extension blades by means of the adjustment mechanism.

To this extent, the same basic principle is in the first place used for the additional pulse as for the second channel establishing the basic pulse component, i.e. the effective cross-section of the associated pair of window cut-outs is variable or adjustable by the displacement of rotor blades and extension blades with respect to one another. Furthermore, the carrier disc and the adjustment piston with the rotor blades and extension blades fitted respectively thereon are disposed on the support disc connected rigidly to the rotor shaft, so that the phase position of the additional pulse relative to the basic pulse can be adjusted by rotation of the carrier disc, with the adjustment piston coupled thereto by the connection of the extension blades and rotor blades, relative to the rotor blade assembly also carried on the support disc for the first basic pulse channel.

For the displacement of the rotor blades and the associated extension blades with respect to one another, provision made such that, as an adjustment mechanism, an opening for receiving in each case an adjustment disc is formed respectively in the rotor blades and the extension blades, wherein the adjustment discs lying with a flange externally on the rotor blades or extension blades and thus sealing the openings are fixed in the opening in a form-fit manner by means of a collar engaging in the respective opening and are rotatable therein. In order to constitute the adjustment mechanism, provision is made such that the adjustment discs, in an arrangement eccentric to their central axis, each comprise a drill hole for receiving a setscrew, whereof one drill hole is provided with an inner thread and the other drill hole is configured for receiving the screw shank of the setscrew.

BRIEF DESCRIPTION OF THE DRAWINGS

An exemplary embodiment of the invention is reproduced in the drawing, which is described below. In the figures.

DESCRIPTION OF SPECIFIC EMBODIMENTS

Figure 1:
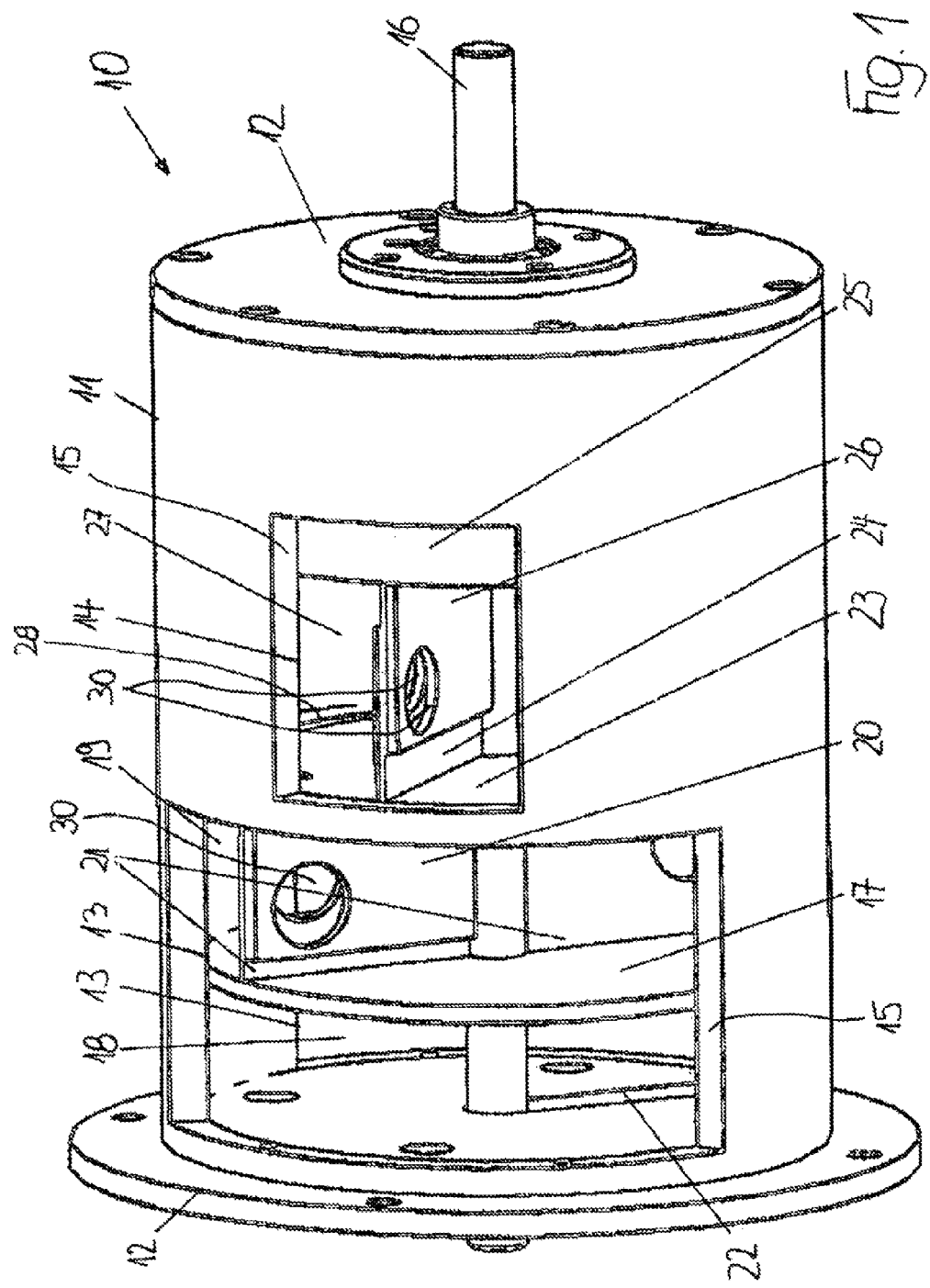
FIG. 1 shows a variable pulse valve in perspective view.

Pulse valve 10 represented in FIG. 1 comprises a cylindrical housing 11, which is closed at the two end faces by housing covers 12. Window cut-outs 13 and 14 lying opposite one another in pairs are disposed in cylindrical housing 11, the respective window out-outs being surrounded by boundary edges 15.

The cylindrical housing is penetrated by a rotor shaft 16 passing through end-face housing covers 12 and mounted in the latter. An adjustment disc 17 adjacent to housing cover 12 on the left in FIG. 1 is in the first place disposed on rotor shaft 16, so that an open first channel 18 is formed between housing cover 12 and adjustment disc 17, said channel permitting a stationary through-flow of fluid through pulse valve 10 when a fluid stream flows against pulse valve 10. To this extent, first channel 18 can also be referred to as a stationary channel and the component of fluid conducted through the latter as a stationary component.

Adjustment disc 17 disposed with its face in the flow direction between window cut-outs 13 divides the flow path predetermined by opposite-lying window cut-outs 13 into first channel 18 already referred to and a second channel 19.

Rotor blades 20 fixed to a support disc (not represented) connected rigidly to rotor shaft 16 are associated with this second channel 19. Since adjustment disc 17 is adjustable with respect to rotor shaft 16 in its axial direction, extension blades 21 are fitted to adjustment disc 17 in the plane of rotor blades 20, said extension blades overlapping with rotor blades 20 by at least the maximum adjustment path of adjustment disc 17, so that rotor blades 20 and extension blades 21 together form a rotor blade assembly, and a rotor blade assembly 20, 21 driven by rotor shaft 16 is thus associated with second channel 19. When rotor shaft 16 is rotated, rotor blades 20 and extension blades 21 temporarily block associated window cut-outs 13, so that the fluid passage through second ill channel 19 is blocked. In this period, only the stationary stream prevails in first stationary channel 18. When the outer edge of rotor blade 20 and extension blade 21 sweeps over associated boundary edge 15 of window cut-out 13, a gradually opening cross-section arises, which allows the passage of an increasingly large volume flow. The flow cross-section diminishes again when the outer edge of rotor blade 20 and extension blade 21 approaches window cut-out boundary edge 15 lying opposite in the direction of rotation. Second channel 19 is closed again when this edge is reached. On account of the opening and closing motion, the sub-stream of the fluid flowing against the pulse valve pulses, said sub-stream flowing through second channel 19 and to be referred to as the basic pulse component.

The ratio of the stationary component flowing through first channel 18 and the basic pulse component flowing through second channel 19 can be adjusted by the fact that adjustment disc 17 is axially adjustable inside the cross-section of window cut-outs 13. In addition, the cross-section of first channel 18 can also be changed by the fitting of block discs 22 to associated end-face housing cover 12. Alternatively, in a manner not represented in detail, provision can be made to provide, on associated end-face housing cover 12, a displaceable piston for changing the cross-section of first channel 18.

Inasmuch as first channel 18 and a second channel 19 are formed by a pair of window cut-outs 13, a separate pair of window cut-outs 14 is provided to form a third channel 27 provided for the generation of a third sub-stream. In order to generate a pulsating sub-stream conveyed through third channel 27 and to be referred to as an additional pulse component, a carrier disc 23 with extension blades 24 disposed thereon and an adjustment piston 25 with rotor blades 26 fitted thereon are provided and coupled with one another by means of an adjustment mechanism producing the connection of extension blades 24 and rotor blades 26, in accordance with the design principle described in respect of second channel 19, wherein the adjustment piston 25 is rotatable and axially mobile with respect to rotor shaft 16. Accordingly, extension blades 24 and rotor blades 26 overlap to a corresponding extent in order to enable a mutual axial adjustment of carrier disc 23 and adjustment piston 25 with respect to one another. Furthermore, carrier disc 23 is supported rotatably on the support disc (not represented), wherein the support of carrier disc 23 on the support disc is effected by means of an elongated hole arrangement 28, so that carrier disc 23 with the rotor blade assembly carried by the latter and comprising extension blades 24 and rotor blades 26 can be rotated with respect to the support disc. A steplessly adjustable variable position of the rotor blade assembly with rotor blades 26 and extension blades 24 associated with third channel 27 with respect to the rotor blade assembly with rotor blades 20 and extension blades 21 associated with second channel 19 is thus enabled. Through the variable and mutually displaceable position of the rotor blade assemblies associated with the two channels 19 and 27, the phase position of the additional pulse generated in third channel 27 can be adjusted relative to the basic pulse, wherein with increasing rotation with respect to one another there is gradually generated in the third additional pulse channel its own small additional pulse component, which can be located upstream or downstream of the basic pulse component generated in the second channel in terms of time.

As can be seen from the drawing, window cut-outs 14 forming third additional pulse channel 27 have a shorter extension, directed in the circumferential direction of housing 11, than window cut-outs 13 associated with first stationary channel 18 and second base pulse channel 19. If, as represented, the height of additional pulse channel 27 is constituted small, a temporarily shorter and steeper additional pulse component is thus generated, whereas a correspondingly large height of window cuts-outs 13 for the basic pulse component generates a long and flat pulse. The amplitudes of the respective pulses are in turn determined by the width of the two channels 19 and 27 measured in the direction of the rotor axis, said width being fixed on the one hand by an axial displacement of extension blades 24 and rotor blades 26 with respect to one another and on the other hand by the axial position of adjustment disc 17.

All rotor blades 20, 26 and respectively extension blades 21, 24 can run either with a very small gap with respect to the inner face of the housing or with a large gap, as a result of which an additional component to the stationary stream can be established.

Figure 2:
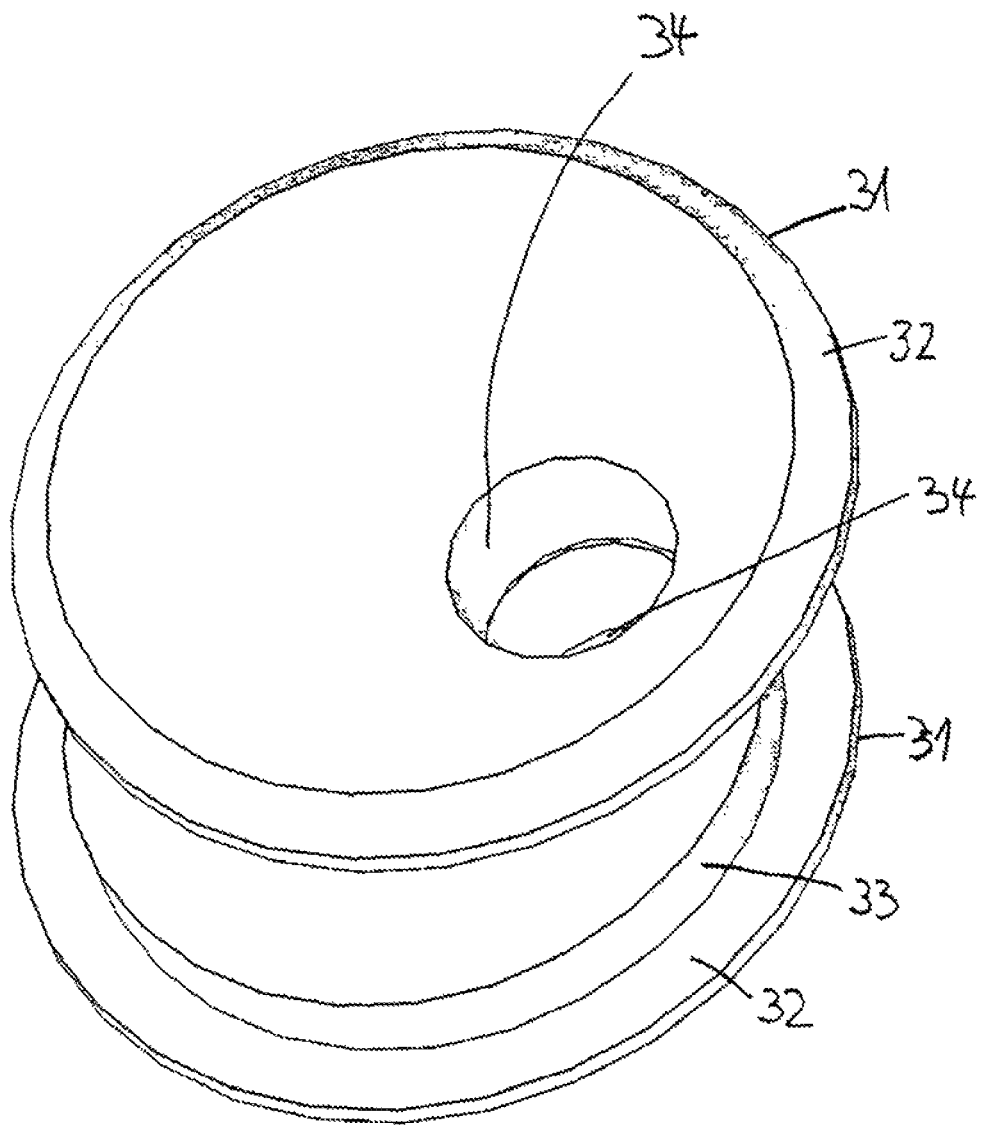
FIG. 2 shows the adjustment mechanism for the axial displacement of the rotor blades in a detail representation.

As can be seen when FIGS. 1 and 2 are viewed together, the adjustment mechanism for the axial adjustment of rotor blades 20, 26 and associated extension blades 21, 24 with respect to one another is constituted in a particularly straightforward and efficient manner, which moreover meets the greatest demands on the tightness of the respective rotor blade assemblies.

As also emerges from FIG. 1, there are formed respectively in rotor blades 20, 26 and associated extension blades 21, 24, in each case, openings 30 which are provided to accommodate adjustment discs 31 represented separately in FIG. 2. As also emerges from FIG. 2, the adjustment discs comprise an outer flange 32 and a collar 33 protruding therefrom, adjustment discs 31 with their collar 33 being inserted into openings 30 of rotor blades 20, 26 and associated extension blades 21, 24. Collars 33 of adjustment discs 31 are held with a precise fit in openings 30, but are rotatable in openings 30.

Furthermore, the two adjustment discs 31 comprise aligned drill holes or bores 34, which however are disposed eccentrically with respect to the central axis of adjustment discs 31 and thus also to openings 30 in rotor blades 20, 26 and respectively extension blades 21, 24. Drill holes 34 in adjustment discs 31 are configured to receive a setscrew (not represented), in such a way that the one drill hole 34 in one adjustment disc 31 is provided with an internal thread for receiving the thread of the setscrew, whilst drill hole 34 in other adjustment disc 31 has a dimension which is such that the screw shank of the setscrew can be passed through. The setscrew can for example be constituted as a countersunk-head screw, to which drill hole 34 of associated adjustment disc 31 accommodating the screw shank is matched, so that drill holes 34 formed in adjustment discs 31 are also sealed by the setscrew. By means of the setscrew, the two adjustment discs 21 can on the one hand be clamped against one another, but on the other hand can also be rotated relative to one another when the setscrew is loosened, the setscrew lying eccentrically forming the axis of rotation for the rotation of adjustment discs 31.

If, after loosening of the setscrew (not represented in detail), upper adjustment disc 31 represented in FIG. 2 for example is rotated to the right in the clockwise direction around the axis of rotation defined by the central axis of drill holes 34, the circumferential region lying opposite associated drill hole 34 rises. Since the region of associated collar 33 of upper adjustment disc 31 lying beneath this circumferential region is thus also raised, the associated part of the rotor blade assembly, for example rotor blade 20, is thus also simultaneously ill raised by associated collar 33 via opening 30 engaging over collar 33 and is thus adjusted in its longitudinal direction, because collar 33 can rotate in associated opening 30. If lower adjustment disc 31 were correspondingly rotated to the left in the anti-clockwise direction, its collar 33 would press associated extension blade 21 carried by it downwards in the plane of the drawings in this way, the parts of the respective rotor blade assembly carried by adjustment discs 31, rotor blades 20 with associated extension blades 21 and respectively rotor blades 26 with associated extension blades 24, can be adjusted by a relative rotation of adjustment discs 31 with respect to one another.

The features of the subject-matter of these documents disclosed in the above description, in the claims, the abstract and the drawing may be essential individually and also in any combinations with one another for the implementation of the invention in its various embodiments.

The specification incorporates by reference the disclosure of German 16 2010 009 617.2 filed Feb. 27, 2010, as well as international application PCT/EP2011/000892 filed Feb. 24, 2011.

The present invention is, of course, in no way restricted to the specific disclosure of the specification and drawings, but also encompasses any modifications within the scope of the appended claims.

The invention claimed is:

1. A pulse valve for generating a high-volume pulsating fluid stream from a fluid supplied to said pulse valve from a pressure-generating unit, comprising:
   a housing having a housing wall, wherein window cut-outs having boundary edges are disposed opposite one another, in pairs, in said housing wall, and wherein said window cut-outs form a first channel for conducting a constant, stationary sub-stream of the pulsating fluid stream generated by said pulse valve, a second channel for generating a second sub-stream of the pulsating fluid stream generated by said pulse valve and that forms a basic pulse component, and third channel for generating a third sub-stream of the pulsating fluid stream generated by said pulse valve and that forms an additional pulse component; and
   a rotatable rotor shaft disposed in the interior of said housing, wherein said rotor shaft is provided with respective rotor blade assemblies associated with said second channel and said third channel respectively, and wherein upon rotation of said rotor shaft said rotor blade assemblies, in cooperation with said boundary edges of said window cut-outs of said second channel and said third channel, are configured to periodically either allow a fluid stream impinging on said pulse valve to pass through said housing, or to interrupt such passage.

2. A pulse valve according to claim 1 wherein said window cut-outs, are configured so as to be adjustable in an extension thereof that is directed toward an oppositely-disposed one of said window cut-outs.

3. A pulse valve according to claim 1, wherein those window cut-outs disposed opposite one another in pairs are disposed in said housing wall in a symmetrical or in an asymmetrical arrangement.

4. A pulse valve according to claim 1, wherein said rotor blade assemblies associated with at least one of said second channel and said third channel are displaceable and/or rotatable relative to said window cut-outs.

5. A pulse valve according to claim 1, wherein said first channel and said second channel are formed by a common pair of said window cut-out, further wherein an adjustment disk is provided in order to divide a flow path thus formed into said first channel and said second channel, further wherein said adjustment disk is disposed on said rotor shaft and a surface of said adjustment disk is oriented in a direction of flow, and wherein a pertaining one of said rotor blade assemblies is disposed on one side of said adjustment disk.

6. A pulse valve according to claim 5, wherein said adjustment disk is displaceably disposed on said rotor shaft, further wherein extension blades of said rotor blade assembly are mounted on said adjustment disk so as to overlap with rotor blades of said rotor blade assembly and to compensate for an adjustment path of said adjustment disk relative to said rotor blades, which are fixed relative to said rotor shaft, and wherein an adjustment mechanism is provided for displacement of said rotor blades and said extension blades relative to one another.

7. A pulse valve according to claim 6, wherein a support disk is fixed to said rotor shaft (16), and wherein said rotor blades are carried by said support disk.

8. A pulse valve according to claim 5, wherein a housing cover of said housing is disposed across from said adjustment disk, and wherein block disks are disposed on said adjustment disk for adjustment of cross-sectional area of said first channel.

9. A pulse valve according to claim 5, wherein a housing cover of said housing is disposed across from said adjustment disk, and wherein a displaceable piston is disposed on said adjustment disk for adjustment of a cross-sectional area of said first channel.

10. A pulse valve according to claim 1, which includes a carrier disk that is rotatable relative to said rotor shaft, which further includes an adjustment piston that is displaceably disposed along said rotor shaft and is rotatable relative to said rotor shaft, wherein separate rotor blade assemblies are associated with that pair of window cut-outs that form said third channel, further wherein said separate rotor blade assemblies comprise extension blades that are mounted on said carrier disk and rotor blades that are connected to said adjustment piston and are disposed so as to overlap said extension blades, and wherein an adjustment mechanism is provided for displacement of said extension blades and said rotor blades relative to one another.

11. A pulse valve according to claim 10, which includes a support disk rigidly connected to said rotor shaft, wherein said carrier disk, with said extension blades mounted thereon is supported on said support disk so as to be rotatable with respect to the latter through a rotation path in such a way that when said carrier disk is rotated relative to said support disk, said extension blades carry along said rotor blades that are connected to said adjustment piston and are coupled with said extension blades by means of said adjustment mechanism.

12. A pulse valve according to claim 6, wherein respective openings are provided in rotor blades and extension blades of said rotor blade assemblies for displacement of said rotor blades and associated extension blades relative to one another, further wherein respective adjustment disks are accommodated in said openings, further wherein a flange of said adjustment disks rests upon said rotor blades or said extension blades to thereby seal said openings, and wherein said adjustment disks are provided with a collar that engages in said openings such that said adjustment disks are fixed in said openings in a form-fit manner and are rotatable in said openings.

13. A pulse valve according claim 12, wherein said adjustment disks are respectively provided with a bore that is eccentrically relative to a central axis of said adjustment disk for receiving a set screw, and wherein one of said bores is provided with an internal thread and the other bore is configured for receiving a screw shank of the set screw.

* * * * *